(12) United States Patent
Yokobayashi et al.

(10) Patent No.: US 9,656,419 B2
(45) Date of Patent: May 23, 2017

(54) BLOW NOZZLE AND BLOW MOLDING MACHINE

(71) Applicant: NISSEI ASB MACHINE CO., LTD., Nagano (JP)

(72) Inventors: Kazuyuki Yokobayashi, Komoro-Shi (JP); Daizaburo Takehana, Komoro-Shi (JP); Fumiyuki Nakazawa, Komoro-Shi (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 63 days.

(21) Appl. No.: 14/419,915

(22) PCT Filed: Aug. 5, 2013

(86) PCT No.: PCT/JP2013/071131
§ 371 (c)(1),
(2) Date: Feb. 5, 2015

(87) PCT Pub. No.: WO2014/024835
PCT Pub. Date: Feb. 13, 2014

(65) Prior Publication Data
US 2015/0190975 A1    Jul. 9, 2015

(30) Foreign Application Priority Data
Aug. 9, 2012 (JP) .................... 2012-176971

(51) Int. Cl.
*B29C 49/58* (2006.01)
*B29C 49/42* (2006.01)
(Continued)

(52) U.S. Cl.
CPC .............. *B29C 49/58* (2013.01); *B29C 49/06* (2013.01); *B29C 49/12* (2013.01);
(Continued)

(58) Field of Classification Search
CPC ............ B29C 49/58; B29C 2049/5844; B29C 2049/5803; B29C 2049/4294
See application file for complete search history.

(56) References Cited

U.S. PATENT DOCUMENTS 5,711,913 A    1/1998  Seki et al.
6,464,486 B1  10/2002  Barray et al.
(Continued)

FOREIGN PATENT DOCUMENTS

CN    102548732       4/2012
DE    10063553 A1     7/2002
(Continued)

OTHER PUBLICATIONS

International Search Report, Application No. PCT/JP2013/071131, mailed Nov. 19, 2013.
(Continued)

*Primary Examiner* — Robert B Davis
(74) *Attorney, Agent, or Firm* — David L. Hoffman; Hoffman Patent Group

(57) ABSTRACT

In one embodiment of this invention, a blow nozzle, which introduces blow air into a molded article in which a flange portion is supported by a blow cavity mold, includes a nozzle main body and an outer nozzle. The outer nozzle includes a first surface brought into press contact with the flange portion and a second surface disposed further outwards in a radial direction than the first surface and being brought into contact with the blow cavity mold. From when the nozzle main body is moved and the first surface is brought into contact with the flange portion to when the second surface is brought into contact with the blow cavity mold and the movement of the nozzle main body is stopped, the first surface of the outer nozzle is overdriven so that the flange portion is airtightly sealed by the first surface.

7 Claims, 5 Drawing Sheets

(51) Int. Cl.
  *B29C 49/06* (2006.01)
  *B29C 49/12* (2006.01)

(52) U.S. Cl.
  CPC ............. *B29C 2049/4294* (2013.01); *B29C 2049/5803* (2013.01); *B29C 2049/5844* (2013.01)

(56) References Cited

U.S. PATENT DOCUMENTS

| 7,674,108 | B2* | 3/2010 | Lemaistre | B29C 49/42 425/535 |
|---|---|---|---|---|
| 2010/0176540 | A1 | 7/2010 | Sperka et al. | |
| 2010/0237528 | A1 | 9/2010 | Derrien et al. | |
| 2012/0114783 | A1 | 5/2012 | Lambert | |

FOREIGN PATENT DOCUMENTS

| EP | 0734836 A1 | 10/1996 |
|---|---|---|
| JP | 11320665 | 11/1999 |
| JP | 2002067131 | 5/2002 |
| JP | 2002307541 | 10/2002 |
| JP | 2004034567 | 5/2004 |
| JP | 2009126130 | 6/2009 |
| JP | 2013132861 | 7/2013 |
| TW | 504450 | 1/2002 |
| WO | 2009004192 A2 | 1/2009 |
| WO | 2013099108 A1 | 4/2013 |

OTHER PUBLICATIONS

Extended European Search Report dated Apr. 4, 2016, Application No. 13828455.9.
Chinese Office Action in Application No. 201380041885.3, dated Dec. 3, 2015.
Taiwanese Office Action dated Aug. 7, 2015.

* cited by examiner

BLOW NOZZLE AND BLOW MOLDING MACHINE

This application is a U.S. national stage application of International Patent Application No. PCT/JP2013/071131, having an international filing date of Aug. 5, 2013, which designated the United States and which claims priority from Japanese Patent Application No. 2012-176971, filed on Aug. 9, 2012, the entirety of both of which are incorporated herein by reference.

TECHNICAL FIELD

The present invention relates to a blow nozzle and a blow molding machine.

BACKGROUND ART

In blow molding, it is normal to press fit a blow core die in a neck portion of a preform which is disposed in a blow cavity mold and to introduce blow air with the neck portion airtightly sealed.

As a different technique from this, blow nozzles are proposed which airtightly seals the neck portion without press fitting the blow core die in the neck portion (Patent Documents 1 to 3). According to these blow nozzles, even with a preform which is reduced in weight and which includes a neck portion whose mechanical strength cannot be ensured sufficiently due to being thinned, deformation of the neck portion can be prevented.

PRIOR ART DOCUMENTS

Patent Documents

Patent Document 1: JP-A-2002-307541
Patent Document 2: JP-A-2004-34567
Patent Document 3: US-A1-2010/0176540

SUMMARY OF THE INVENTION

Problem that the Invention is to Solve

Patent Documents 1 to 3 are similar in that the neck portion is airtightly sealed without press fitting the blow core die in the neck portion, but are different in location where the airtight sealing is provided.

Patent Document 1 discloses a blow nozzle in which an end face of an outer nozzle which surrounds the neck portion comes into contact with a blow cavity mold via an airtight seal material such as a packing. In this way, an airtight space is held around the circumference of the neck portion. However, this airtight space faces parting faces of a pair of blow cavity split molds which configures the blow cavity mold. In order to prevent a molding failure which would be caused by blow air which leaks from the parting faces to the cavity, a special air vent needs to be provided to the blow cavity mold so as to cause the blow air leaking between the parting faces to escape not back to the cavity but to the atmosphere. The blow cavity mold having the special construction described above is not only expensive but also complex and troublesome in maintenance.

Patent Document 2 discloses a blow nozzle in which an outer nozzle (an abutment member) is movably supported between a nozzle main body and a holding member which is fixed to the nozzle main body via an elastic member such as an O ring. The outer nozzle (the abutment member) is brought into elastic contact with a support ring (an example of a flange portion) of the preform by an elastic member, whereby the support ring is airtightly sealed. According to this system, however, the airtight sealing capability depends upon the stopping position of the nozzle main body, and in case the nozzle main body is overdriven to exceed the elastic limit of the elastic member, the support ring becomes broken.

Patent Document 3 discloses a blow nozzle in which an inner nozzle is supported movably via an elastic member such as a compression coil spring between a nozzle main body and an outer nozzle which is fixed to the nozzle main body. The inner nozzle is brought into elastic contact with an end face of the neck portion of the preform by an elastic member, whereby the end face (the upper end face) of the neck portion is airtightly sealed. However, also according to this system, similar to Patent Document 2, the airtight sealing capability depends upon the stopping position of the nozzle main body.

In addition, in Patent Documents 1 to 3, the elastic members like the packing, the O ring and the compression coil spring are essential in airtightly sealing the neck portion.

Accordingly, an object of some aspects of the invention is to provide a blow nozzle and a blow molding machine which stabilize the airtight sealing capability by making the stopping position of a nozzle main body constant, and further, prevent the breakage of a flange portion of a molded article which is sealed airtightly even if an elastic member is not necessarily used.

Means for Solving the Problem (1) An aspect of the invention is related to a blow nozzle that introduces blow air into a molded article in which a flange portion provided around an open neck portion is supported by a blow cavity mold, the blow nozzle including: a nozzle main body moved upwards and downwards; and a cylindrical outer nozzle connected integrally to the nozzle main body and disposed around a circumference of the neck portion, characterized in that: the outer nozzle includes: a first surface brought into press contact with the flange portion and continuing in a circumferential direction; and a second surface disposed outwards in a radial direction than the first surface and being brought into contact with the blow cavity mold, and from when the nozzle main body is moved and the first surface is brought into contact with the flange portion to when the second surface is brought into contact with the blow cavity mold and the movement of the nozzle main body is stopped, the first surface of the outer nozzle is overdriven so that the flange portion is airtightly sealed by the first surface.

According to the aspect of the invention, the stopping position of the nozzle main body is determined unambiguously by a position where the second surface of the outer nozzle which moves together with the nozzle main body is brought into contact with the blow cavity mold. The first surface of the outer nozzle is brought into contact with the flange portion of the molded article before the nozzle main body is stopped, and the first surface of the outer nozzle is overdriven until the nozzle main body is stopped. This causes the first surface of the outer nozzle to bite into the flange portion of the molded article, whereby the flange portion can be sealed airtightly. Namely, the airtight sealing portion is formed by the press contact of the first surface with the flange portion. Although the overdriven amount is dependent on the accuracy of the thickness of the flange portion of the molded article which is injection molded, since the stopping position of the nozzle main body is constant, a high accuracy is obtained. Consequently, the airtight sealing capability based on the overdriven amount becomes almost constant. Moreover, no elastic member is necessary in the airtight sealing action described above. Since no elastic member is used, although the second surface of the outer nozzle is in contact with the blow cavity mold, the airtight sealing capability there is not perfect. In the aspect of the invention, however, as has been described above, since the airtight sealing portion is formed at the flange portion of the molded article, there is no problem even if the airtight sealing capability at the contact portion of the second surface of the outer nozzle with the blow cavity mold is imperfect.

(2) In the aspect of the invention, the blow nozzle may further include an air vent groove communicating from an inner edge of the second surface to an outer edge of the second surface. Namely, no such airtight sealing capability as that disclosed in Patent Document 1 is present in the interface between the second surface of the outer nozzle and the blow cavity mold, and a communication with the atmosphere is established via the air vent groove. Consequently, air which flows out from a narrow space between the outer nozzle and the neck portion immediately before the second surface comes into contact with the blow cavity mold can be discharged to the atmosphere even after the airtight sealing portion has been formed. In this way, air of a relatively high pressure does not remain at radially outwards of the airtight sealing portion and inwards of the outer nozzle. This prevents the generation of an external force which disturbs the movement of the nozzle main body to its stopping position.

(3) In the aspect of the invention, the outer nozzle may have a recessed portion receding inwards from the second surface, the first surface may be formed on a bottom surface of the recessed portion, and at a position which is spaced by a predetermined distance in a radial direction from a vertical center line of the blow nozzle and the molded article, when a depth of the recessed portion from the second surface to the first surface is referred to as d, an overdriven amount of the first surface of the outer nozzle is referred to as $\delta$, and a thickness of the flange portion is referred to as t, $d=t-\delta$ may be established.

In this way, by adjusting the depth d of the recessed portion formed on the end face of the outer nozzle, it is possible to set a desired overdriven amount $\delta$ according to the thickness t of the flange portion over the region where the first surface is brought into contact therewith.

(4) In the aspect of the invention, the blow nozzle may further include a cylindrical inner nozzle disposed within the outer nozzle and introducing the blow air into the neck portion, and the inner nozzle may include an insertion portion inserted into the neck portion in association with a movement of the nozzle main body before the first surface is brought into contact with the flange portion, the insertion portion being inserted into the neck portion to center the molded article.

Here, the insertion portion of the inner nozzle has an outer diameter which is slightly smaller than an inner diameter of the neck portion, which eliminates a situation in which the insertion portion is press fitted in the neck portion, and it is only necessary that the inner nozzle has the function to center the molded article as a result of the insertion portion being inserted into the neck portion. The insertion portion of the inner nozzle can execute the centering of the molded article and prevent the neck portion of the molded article from being deformed by being expanded inwards. The centering of the molded article is executed before the first surface of the outer nozzle is brought into contact with the flange portion of the molded article. This enables the first surface of the outer nozzle to be reliably brought into press contact with the flange portion of the molded article which is centered. Since the neck portion of the molded article is centered by the inner nozzle in the way described above, an inner diameter of the outer nozzle can have a dimension which is slightly larger than an outer diameter of the neck portion. Accordingly, the neck portion is restricted from being deformed by being expanded outwards by the inner surface of the outer nozzle.

(5) In the aspect of the invention, the inner nozzle may include: a base end flange supported by being held between the nozzle main body and the outer nozzle; an airtight seal member provided between facing surfaces of the base end flange portion and the nozzle main body; and a third surface formed to be diametrically larger than an outer diameter of the insertion portion, being brought into elastic contact with an end face of the neck portion by the airtight seal member, and continuing in the circumferential direction.

The inner nozzle is supported by the nozzle main body by the base end flange being held between the nozzle main body and the outer nozzle. The airtight seal member is disposed in a joining plane between the nozzle main body which defines the blow air flow path and the inner nozzle. In addition to airtightly sealing the connecting portion between the nozzle main body and the outer nozzle, this airtight sealing member also serves as the elastic member when the third surface of the inner nozzle is brought into elastic contact with the end face of the neck portion. The airtight sealing capability at the neck portion of the molded article is enhanced further by the two airtight sealing portions at the flange portion and at the end face of the neck portion.

(6) In the aspect of the invention, the inner nozzle may further include an air passage which communicates from an inner surface to an outer surface of the inner nozzle within a region between the base end flange and the insertion portion.

By adopting this configuration, even if the end face of the neck portion is airtightly sealed, internal and external pressures of the neck portion can be made equal by the air passage. This prevents blow air from acting to expand further the neck portion after a hollow container has been blow molded, thereby preventing the deformation of the neck portion.

(7) In the aspect of the invention, when the overdriven amount of the first surface of the outer nozzle is referred to as $\delta$, $0<\delta\leq0.1$ mm may be established. More preferably, $0<\delta\leq0.05$ mm may be established. With the overdriven amount $\delta$ within this range, it is possible to ensure the airtight sealing capability against blow air without causing an indentation left on the flange portion of the molded article to deteriorate the external appearance of a hollow container to be blow molded.

(8) Another aspect of the invention is related to a blow molding machine that blow molds the molded article having the flange portion at the neck portion thereof into a hollow container, the blow molding machine including: the blow cavity mold which supports the flange portion of the molded article and in which the molded article is disposed within a cavity where the hollow container is blow molded; and the blow nozzle according to any one of the above-described (1) to (7).

In the blow molding machine according to the other aspect of the invention, a hollow container can be blow molded while the above-described blow nozzle exhibits the working effects described in (1) to (7).

Advantage of the Invention

According to the invention, it is possible to provide the blow nozzle and the blow molding machine which stabilize the airtight sealing capability by making the stopping position of the nozzle main body constant, and further, prevent the breakage of the flange portion of the molded article which is sealed airtightly even if an elastic member is not necessarily used.

MODE FOR CARRYING OUT THE INVENTION

Hereinafter, an embodiment of the invention will be described in detail by the use of the drawings. The following embodiment is not intended to unreasonably limit the contents of the invention which will be claimed later. Additionally, all configurations which will be described below are not necessarily essential constituent elements of the invention.

1. Blow Molding Part

Figure 1:
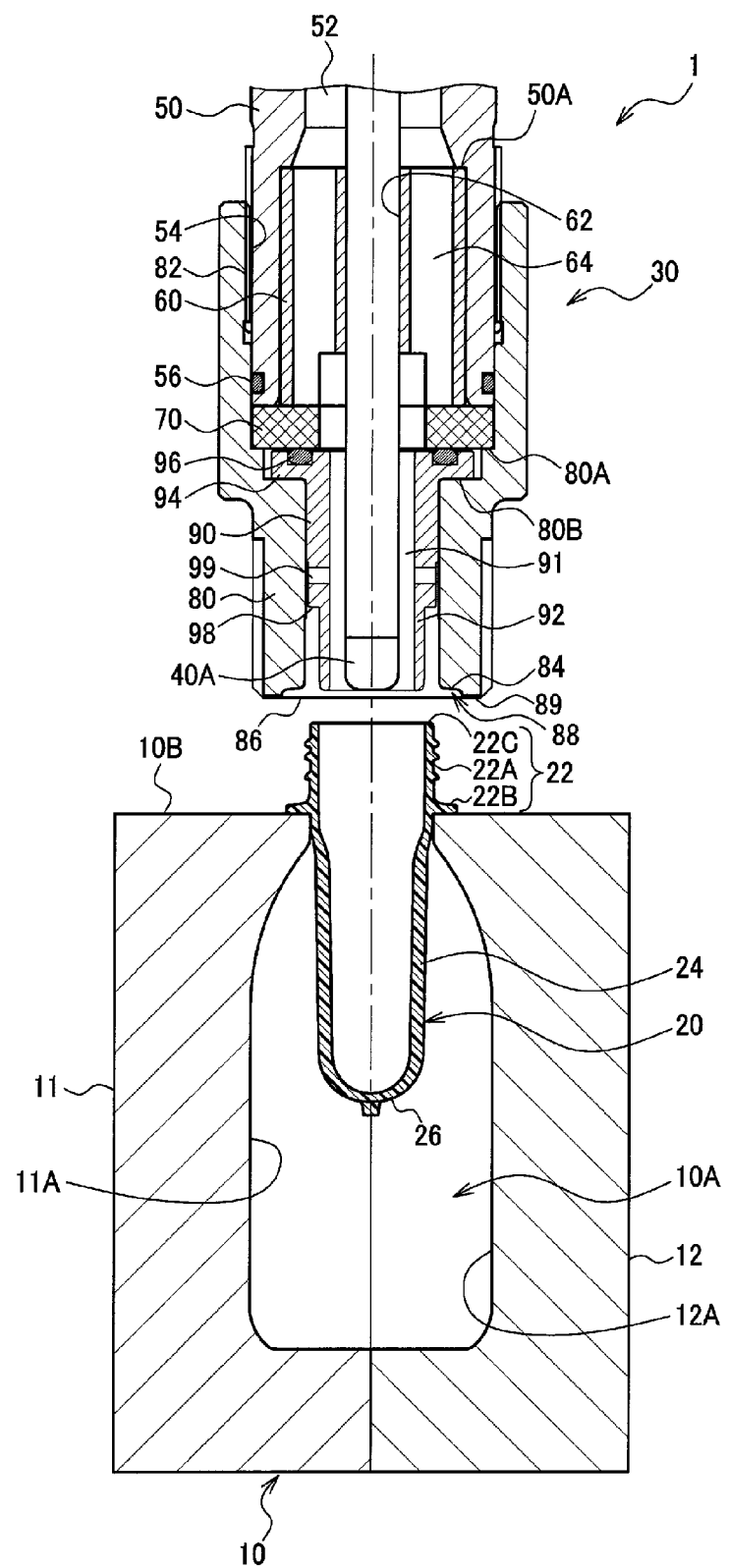
FIG. 1 is a sectional view of a blow molding machine according to an embodiment of the invention showing a blow nozzle in a waiting state.
Figure 2:
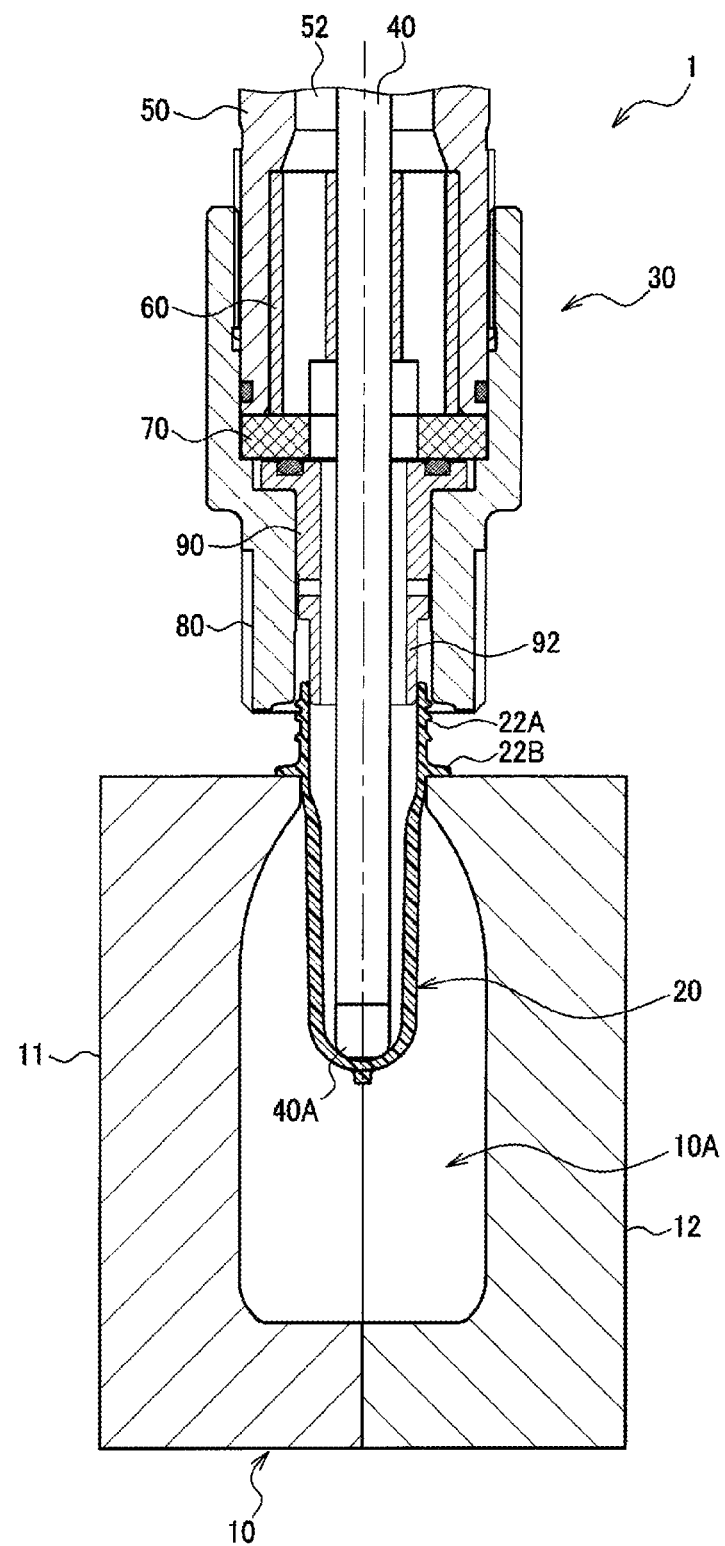
FIG. 2 is a sectional view of the blow molding machine showing the blow nozzle being in the middle of a moving state resulting immediately after the blow nozzle has started descending from the waiting state shown in FIG. 1.
Figure 3:
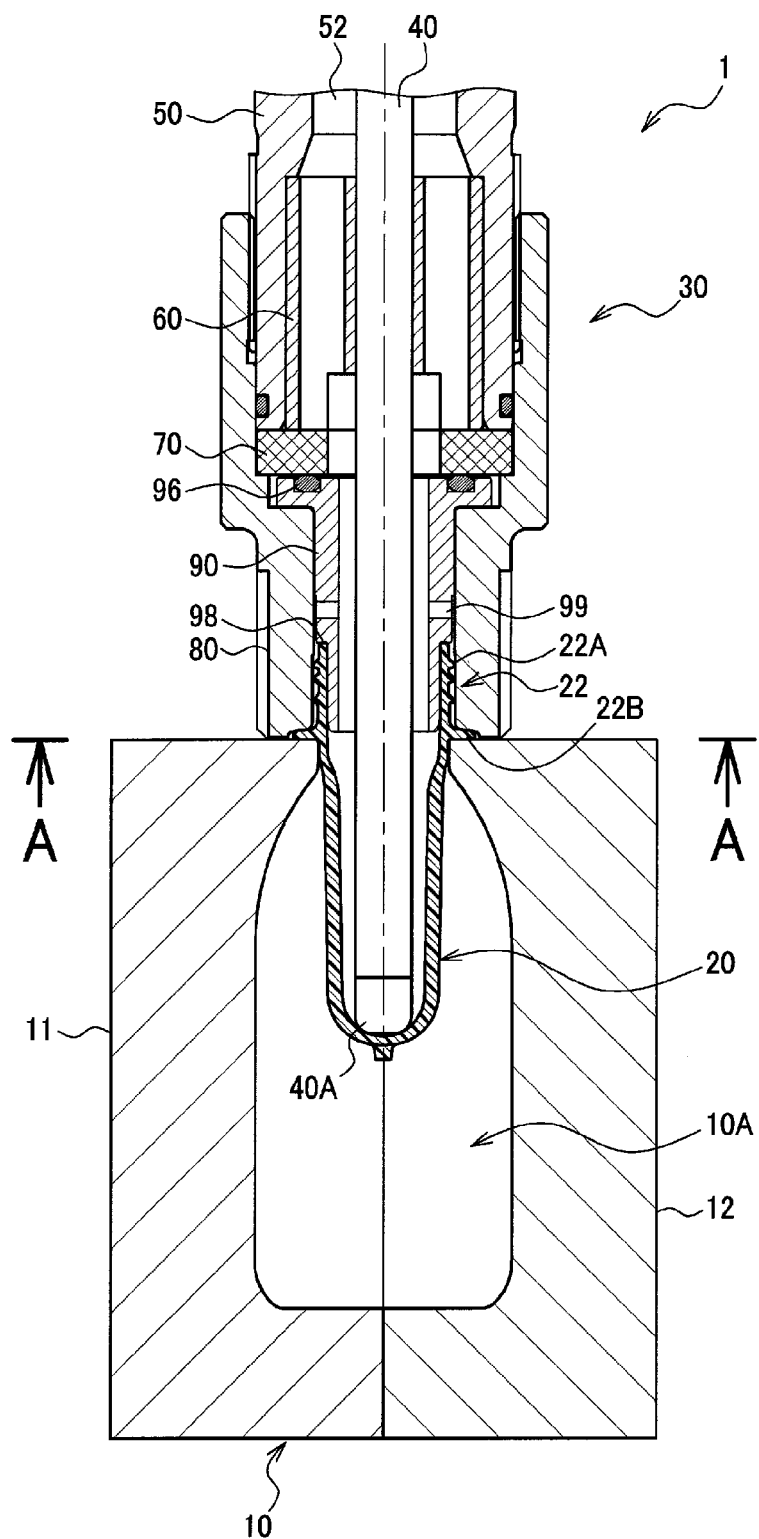
FIG. 3 is a sectional view of the blow molding machine showing the blow nozzle having reached a state where the blow nozzle airtightly seals a neck portion.

FIGS. 1 to 3 show a blow molding part 1 of a blow molding machine. In FIGS. 1 to 3, a molded article, for example, an injection molded preform 20, is disposed within a blow cavity mold 10 which is configured by a pair of blow cavity split molds 11, 12 which are closed and clamped together.

As shown in FIG. 1, the preform 20 has a neck portion 22, a body portion 24 and a bottom portion 26. A threaded portion 22A and a flange portion, for example, a support ring 22B, are formed to the neck portion 22. An opening end of the neck portion 22 is referred to as an end face (a top end face) 22C. The preform 20 is supported by the blow cavity mold 10 with the support ring 22B mounted on upper surfaces of the pair of blow cavity split molds 11, 12 which are closed and clamped together.

As shown in FIG. 1, the blow cavity mold 10 has a cavity 10A which is defined by cavity surfaces 11A, 12A which correspond to external shapes of a body portion and a bottom portion of a hollow container which is blow molded from the preform 20.

2. Blow Nozzle

FIGS. 1 to 3 show a blow nozzle 30 which introduces blow air from the neck portion 22 of the preform 20 into the preform 20. In FIG. 1, the blow nozzle 30 is waited above the preform 20. FIG. 2 shows a state in which the blow nozzle 30 has started descending. FIG. 3 shows a state in which the neck portion 22 of the preform 20 is sealed by the blow nozzle 30.

As shown in FIGS. 1 to 3, the blow nozzle 30 can move and guide an extending rod 40 which includes a distal end portion 40A which can be brought into contact with an inner surface of the bottom portion 26 of the preform 20. The extending rod 40 is used to center the preform 20 and to extend the preform 20 along a vertical axis while the preform 20 is being blow molded.

The blow nozzle 30 has a nozzle main body 50 which is moved upwards and downwards by a reciprocating driving mechanism such as an air cylinder or the like and a cylindrical outer nozzle 80 which is disposed around a circumference of the neck portion 22. The nozzle main body 50 includes a flow path 52 of blow air. In the case of the blow nozzle 30 including the extending rod 40, as shown in FIG. 1, a bush 60 can be disposed within the nozzle main body 50 to guide the extending rod 40 slidably. The bush 60 has, for example, a double-tube construction, the extending rod 40 is guided by a hole 62 a center of the bush 60, and a hole 64 at an outer circumference constitutes a flow path for blow air.

2.1. Outer Nozzle of Blow Nozzle

As shown in FIG. 1, the outer nozzle 80, which is integrally connected to the nozzle main body 50, has an internal thread portion 82 at a base end side thereof, for example, and an external thread portion 54 is provided on an outer surface of the nozzle main body 50 so that the internal thread portion 82 is screwed on to the external thread portion 54. In assembling the blow nozzle 30, the bush 60 and a pressure bearing ring 70 are inserted into the nozzle main body 50. Thereafter, the outer nozzle 80 is screwed on to the nozzle main body 50. By doing so, the bush 60 and the pressure bearing ring 70 are held between a first step portion 50A of the nozzle main body 50 and a second step portion 80A of the outer nozzle 80 to thereby be fixed in place therebetween. Additionally, in this embodiment, an inner nozzle 90 can be further provided. The inner nozzle 90 can be fixed in place by being held between the pressure bearing ring 70 and a third step portion 80B of the outer ring 80.

As shown in FIG. 1, an O ring 56 serving as an airtight seal material as an example is installed between the outer surface of the nozzle main body 50 and an inner surface of the outer nozzle 80. Here, similarly to the bush 60 which is necessary only when the extending rod 40 is disposed, the inner nozzle 90 is not essential. A function performed by the inner nozzle 90 when it is provided will be described later.

Figure 4:
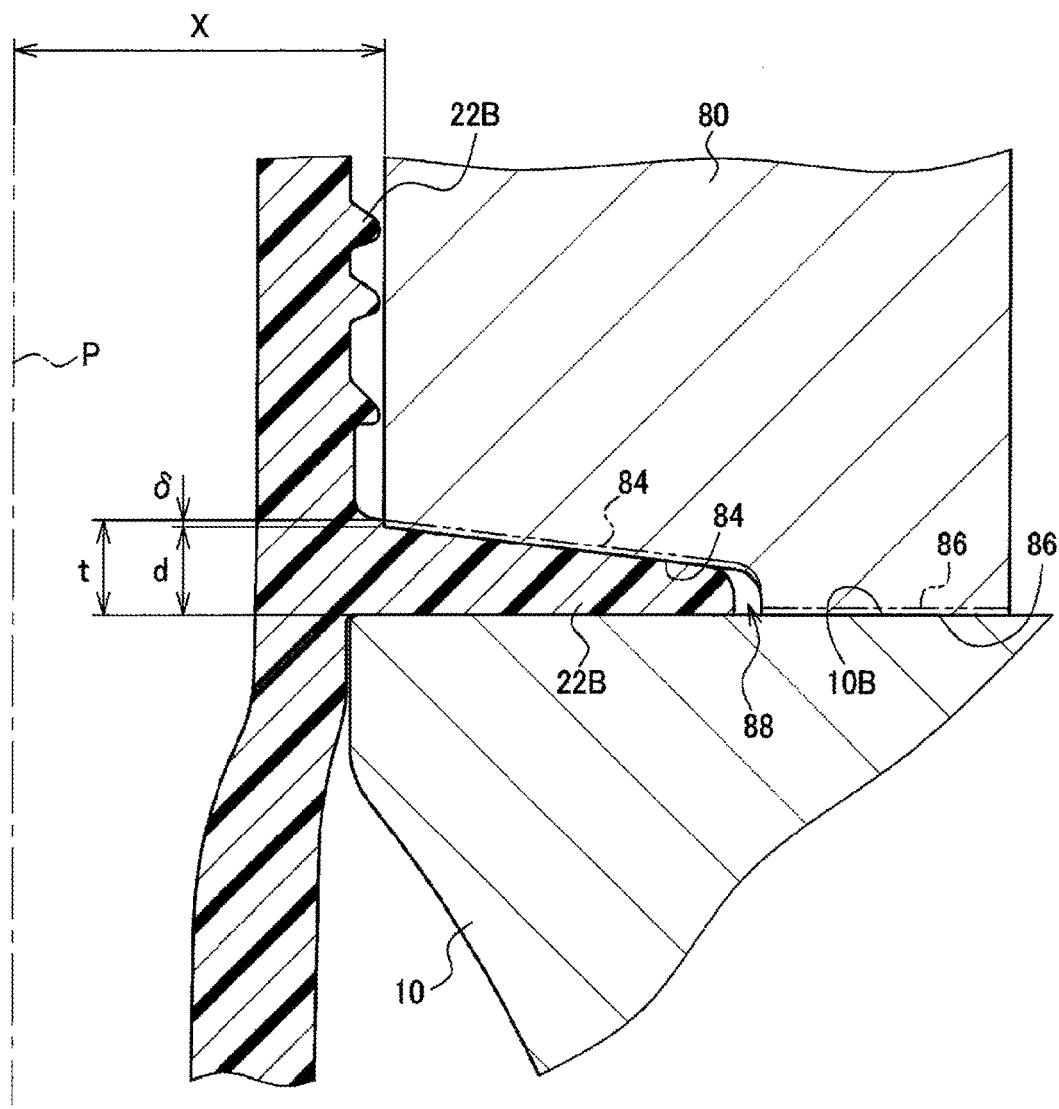
FIG. 4 is a partially enlarged view of FIG. 3 illustrating an overdriven amount of a first surface of an outer nozzle.

As shown in FIG. 4 which is a partial enlarged view of FIGS. 1 and 3, the outer nozzle 80 has a first surface 84 which is brought into press contact with the support ring (flange portion) 22B and continues along a circumferential direction, and a second surface 86 which is disposed outwards in a radial direction than the first surface 84 and is brought into contact with the blow cavity mold 10. In this embodiment, an endmost surface of the outer nozzle 80 serves as the second surface 86.

In this embodiment, the nozzle main body 50 is moved to descend from a position shown in FIG. 1 to a position shown in FIG. 3 by way of a position shown in FIG. 2. The first surface 84 of the outer nozzle 80 is brought into contact with the flange portion and the support ring (flange portion) 22B immediately before the nozzle main body 50 reaches the state shown in FIG. 3. Positions of the first surface 84 and the second surface 86 at this time are indicated by chain double-dashed lines in FIG. 4. The position of the first surface 84 which is indicated by the chain double-dashed line coincides with the position of an upper surface of the support ring (flange portion) 22B. At this time, as indicated by the chain double-dashed line in FIG. 4, the second surface 86 is not brought into contact with an upper surface 10B of the blow cavity mold 10.

The nozzle main body 50 continues to descend, and when the second surface 86 is brought into contact with the upper surface 10B of the blow cavity mold 10 (the state shown in FIG. 3), the movement of the nozzle main body 50 is stopped. Namely, the second surface 86 of the outer nozzle 80 serves as a lower limit stopper of the blow nozzle 30. Positions of the first surface 84 and the second surface 86 of the outer nozzle 80 when the nozzle main body 50 comes to a stop are indicated by solid lines in FIG. 4. However, a distance between the chain double-dashed line and the solid line with respect to the second surface 86 is drawn exaggeratedly larger than a dimension in reality.

Namely, the first surface 84 of the outer nozzle 80 is overdriven further from the position indicated by the chain double-dashed line to move to the position indicated by the solid line. The first surface 84 of the outer nozzle 80 brought into press contact with the support ring (flange portion) 22B to such an extent that the support ring (flange portion) 22B is compressively deformed. This enables the support ring (flange portion) 22B to be airtightly sealed by the first surface 84 of the outer nozzle 80.

Here, the stopping position of the nozzle main body 50 is determined unambiguously by the position where the second surface 86 of the outer nozzle 80, which moves together with the nozzle main body 50, is brought into contact with the blow cavity mold 10. Although the overdriven amount is dependent on the accuracy of the thickness dimension of the support ring (flange portion) 22B of the injection molded preform 20, since the stopping position of the nozzle main body 50 is constant, a high accuracy is obtained. Consequently, the airtight sealing capability based on the overdriven amount becomes almost constant. Moreover, no elastic member like the elastic members described in Patent Documents 1 to 3 is necessary in ensuring the airtight sealing. Thus, according to this embodiment, it is possible to reliably realize a high airtight sealing capability with a simple construction in which an elastic member is not necessary. Since no elastic member is used, although the second surface 86 of the outer nozzle 80 is in contact with the blow cavity mold 10, the airtight sealing capability there is not perfect. In this embodiment, however, there will be no problem even if the airtight sealing capability at the contact portion between the second surface 86 of the outer nozzle 80 and the blow cavity mold 10 is imperfect. This is because the airtight sealing capability is ensured by the pressure contact of the first surface 84 of the outer nozzle 80 with the support ring (flange portion) 22B.

As shown in FIGS. 1 and 4, the outer nozzle 80 can have a recessed portion 88 which recedes further inwards than the second surface 86 which is the endmost surface. In this case, the first surface 84 is formed on a bottom surface of the recessed portion 88. Although the first surface 84 is shown as being formed over the whole of the bottom surface of the recessed portion 88 in FIG. 4, the first surface 84 may be formed partially.

Here, as shown in FIG. 4, at a position which is spaced by a predetermined distance x in a radial direction from a vertical center line P of the blow nozzle 30 and the preform 20, a depth of the recessed portion 88 from the second surface 86 to the first surface is referred to as d, an overdriven amount of the first surface 84 of the outer nozzle 80 is referred to as δ, and a thickness of the support ring (flange portion) 22B is referred to as t. Although the distance from the center line P to the position of the inner surface of the outer nozzle 80 is defined as x in FIG. 4, other positions may be adopted. In this case, d=t−δ is established.

In this way, by adjusting the depth d of the recessed portion 88 formed on the endmost face (the second surface 86) of the outer nozzle 80, it is possible to set a desired overdriven amount δ according to the thickness t of the flange portion over the region where the first surface 84 is brought into contact therewith. Namely, the overdriven amount δ can be changed by adjusting the depth d of the recessed portion 88. This makes it possible to control the airtight sealing capability to a desired level.

The overdriven amount δ of the first surface 84 can be $0<\delta\leq0.1$ mm. With the overdriven amount δ within this range, it is possible to ensure the airtight sealing capability against blow air without causing an indentation left on the support ring (flange portion) 22B to deteriorate the external appearance of a hollow container to be blow molded. It is more preferable that the overdriven amount δ of the first surface 84 is $0<\delta\leq0.05$ mm. In this case, the indentation becomes difficult to be visually confirmed.

Figure 5:
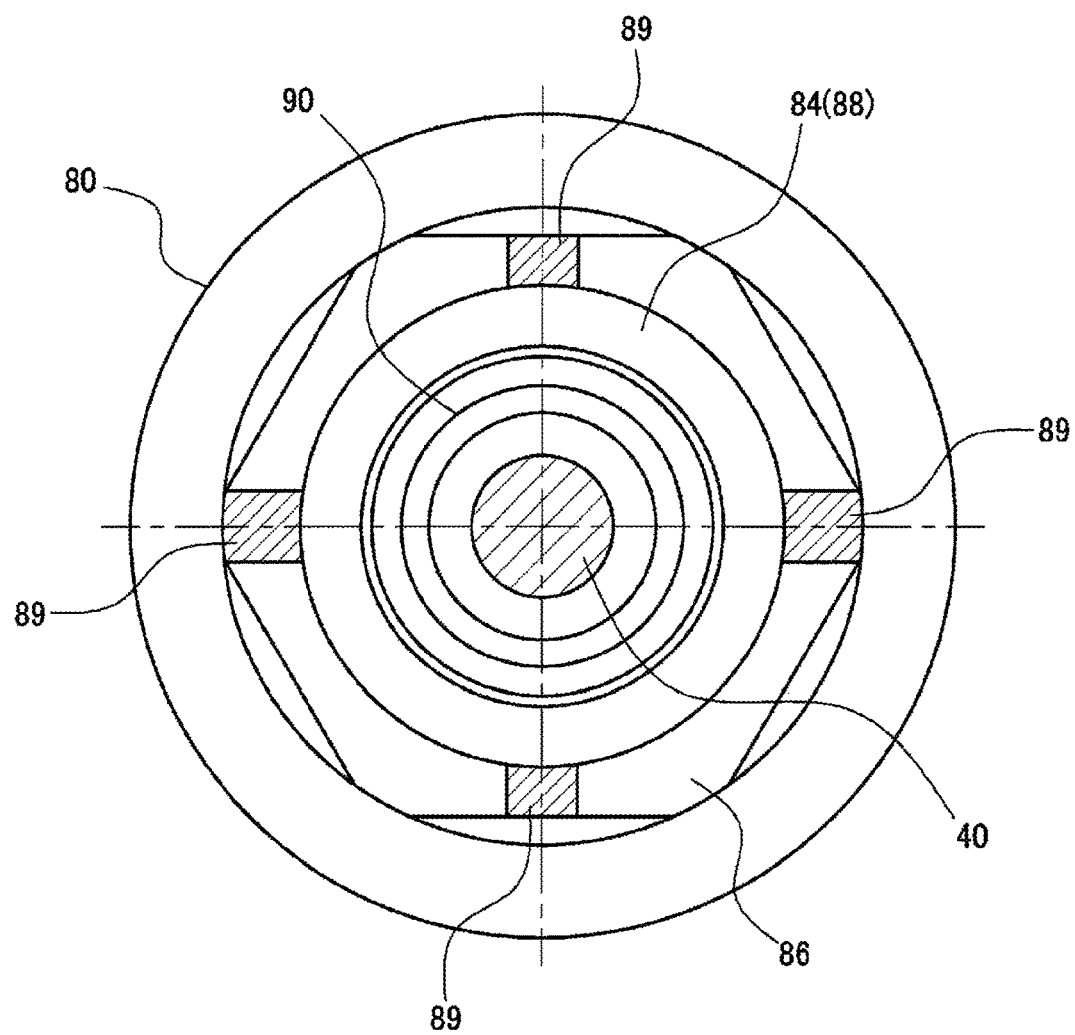
FIG. 5 is a bottom view of the blow nozzle as seen from a direction indicated by arrows A-A in FIG. 3.

FIG. 5 is a bottom view of the blow nozzle 30 as seen from a direction indicated by arrows A-A in FIG. 3. The outer nozzle 80 can further have air vent grooves 89 which communicate from an inner edge of the second surface 86 to an outer edge of the second surface 86 at, for example, four regions which are shown by hatchings in FIG. 5. The air vent groove 89 can be formed into a groove having a depth of 0.2 mm, for example, from the second surface 86 as shown in FIG. 1. Namely, no such airtight sealing capability as that disclosed in Patent Document 1 is present in an interface between the second surface 86 of the outer nozzle 80 and the blow cavity mold 10, and a communication with the atmosphere is established via the air vent grooves 89. Consequently, air which flows out from a narrow space between the outer nozzle 80 and the neck portion 22 immediately before the second surface 86 comes into contact with the blow cavity mold 10 can be discharged to the atmosphere even after the airtight sealing portion has been formed by the first surface 84 and the support ring (flange portion) 22B. In this way, air of a relatively high pressure does not remain at radially outwards of the airtight sealing portion 22B, 84 and inwards of the outer nozzle 80. This prevents the generation of an external force which disturbs the movement of the nozzle main body 50 to its stopping position.

2.2. Inner Nozzle

In this embodiment, the blow nozzle 30 can further have the cylindrical inner nozzle 90 which is disposed inside the outer nozzle 80 to introduce blow air into the neck portion 22. As shown in FIG. 1, the inner nozzle 90 has a hole 91 which serves as both a passageway for the extending rod 40 and a flow path for blow air.

As shown in FIG. 2, the inner nozzle 90 has an insertion portion 92 which is inserted into the neck portion 22 in association with a descending movement of the nozzle main body 50 before the first surface 84 is brought into contact with the support ring 22B. A first function of the inner nozzle 90 is to center the preform 20 as a result of the insertion portion 92 being inserted into the neck portion 22.

Here, the insertion portion 92 of the inner nozzle 90 has an outer diameter which is smaller than an inner diameter of the neck portion 22, which eliminates a situation in which the insertion portion 92 is press fitted in the neck portion 22, and it is only necessary that the inner nozzle 90 has the function to center the preform 20 as a result of the insertion portion 92 being inserted into the neck portion 22. In addition to the first function to center the preform 20, the insertion portion 92 of the inner nozzle 90 can exhibit a second function to prevent the neck portion 22 of the preform 20 from being deformed by being expanded inwards. The centering of the preform 20 is executed before the first surface 84 of the outer nozzle 80 is brought into contact with the support ring 22B of the preform 20. This enables the first surface 84 of the outer nozzle 80 to be reliably brought into press contact with the support ring 22B of the preform 20 which is centered. Since the neck portion 22 of the preform 20 is centered by the inner nozzle 90 in the way described above, an inner diameter of the outer nozzle 80 can have a dimension which is slightly larger than an outer diameter of the neck portion 22 (a largest diameter of the threaded portion 22A). Accordingly, the neck portion 22 is restricted from being deformed by being expanded outwards by the inner surface of the outer nozzle 80.

As shown in FIG. 1, the inner nozzle 90 can have a base end flange 94 which is supported by being held between the nozzle main body 50 and the outer nozzle 80, an airtight seal member 96 which is provided between facing surfaces of the base end flange 94 and the nozzle main body 50, and a third surface 98 which is formed to be diametrically larger than the outer diameter of the insertion portion 92, which is brought into elastic contact with the end face 22c of the neck portion 22 by the airtight seal member 96, and which continues in the circumferential direction.

The inner nozzle 90 is supported by the nozzle main body 50 by the base end flange 94 being held between the nozzle main body 50 and the outer nozzle 80. An airtight seal member such as an O ring 96, for example, is disposed in a joining plane between the nozzle main body 50 which defines the blow air flow path 52 and the inner nozzle. This O ring 96 also serves as an elastic member when the third surface 98 of the inner nozzle 90 is brought into elastic contact with the end face 22C of the neck portion 22 (FIG. 3). The airtight sealing capability at the neck portion 22 of the perform 20 is enhanced further by the two airtight sealing portions at the support ring 22B and the end face 22C of the neck portion 22.

In this embodiment, the inner nozzle 90 can have an air passage 99 which communicates from an inner surface to an outer surface of the inner nozzle 90 within a region between the base end flange 94 and the insertion portion 92.

By adopting this configuration, even if the end face 22C of the neck portion 22 is airtightly sealed, internal and external pressures of the neck portion 22 can be made equal by the air passage 99. This prevents blow air from acting to expand further the neck portion 22 after a hollow container has been blow molded, thereby preventing the deformation of the neck portion 22.

While the embodiment has been described in detail heretofore, a person skilled in the art to which the invention pertains can easily understand that various modifications can be made thereto without departing substantially from the novel matters and advantages of the invention. Accordingly, the modified examples will be included in the scope of the invention.

For example, a term which is described together with a different term having a broader or the same meaning at least once in the specification or the drawings can be replaced with the different term in any other portions in the specification or the drawings.

In this embodiment, a driving mechanism can be provided which can stop the blow nozzle 30 in three locations, that is, a withdrawal position which is further upwards than the waiting position shown in FIG. 1, the waiting position shown in FIG. 1, and the sealing position shown in FIG. 3. The preform 20 is transferred to the blow molding part 1 shown in FIGS. 1 to 3 by a transfer member (not shown) which grabs the neck portion 22 of the preform 20. If the blow nozzle 30 is shifted from the withdrawal position to the waiting position shown in FIG. 1 to be kept waiting for operation, the blow nozzle 30 can be placed around the neck portion for sealing quickly without a risk of interfering with the transfer member. A driving mechanism disclosed by the applicant of this patent application in JP-A-2009-126130 can preferably be used as the driving mechanism which can stop the blow nozzle 30 in the three positions of the withdrawal position, the waiting position and the sealing position.

A molded article having a neck portion, to which this invention is directed, is not limited to the injection molded preform and hence may be a primary blow molded article produced by primarily blow molding the preform. Namely, the blow cavity mold of the invention may be a secondary blow cavity mold, and hence, the invention may be applied in blow molding a secondary blow molded article (a final molded article) from the primary blow molded article.

Additionally, the first surface 84 of the outer nozzle 80 is not limited to the first surface 84 which is formed over the whole or part of the bottom surface of the recessed portion 88 which recedes inwards from the second surface 86. In this embodiment, as shown in FIGS. 1 to 3, although the upper surface 10B of the blow cavity mold 10 is flat, and the mounting surface of the support ring 22B and the contact surface of the second surface 86 constitute the same plane 10B, the invention is not limited thereto. The first surface 84 may be located on the same plane as the second surface 86 of the outer nozzle 80 or may project further outwards than the second surface 86 depending on whether or not the mounting surface of the support ring 22B and the contact surface of the second surface 86 constitute the same plane.

While the invention has been described in detail and by reference to the specific embodiment, it is obvious to those skilled in the art to which the invention pertains that various alterations or modifications can be made thereto without departing from the spirit and scope of the invention.

This patent application is based upon the Japanese Patent Application No. 2012-filed on Aug. 9, 2012, the contents of which are incorporated herein by reference.

DESCRIPTION OF REFERENCE NUMERALS AND CHARACTERS

1: blow molding part;
10: blow cavity mold;
10A: cavity;
20: molded article (preform);
22: neck portion;
22A: threaded portion;
22B: flange portion (support ring);
24: body portion;
26: bottom portion;
30: blow nozzle;
40: extending rod;
50: nozzle main body;
60: bush;
70: pressure bearing ring;
80: outer nozzle;
84: first surface;
86: second surface;
88: recessed portion;
89: air vent groove;
90: inner nozzle;
92: insertion portion;
94: base end flange;
96: airtight seal member;

98: third surface;
99: air passage;
d: depth of recessed portion;
t: thickness of flange portion;
δ: overdriven amount.

The invention claimed is:

1. A blow nozzle that introduces blow air into a molded article in which a flange portion provided around an open neck portion is supported by a blow cavity mold, the blow nozzle comprising:
   a nozzle main body moved upwards and downwards; and
   a cylindrical outer nozzle connected integrally to the nozzle main body and disposed around a circumference of the neck portion,
      wherein the outer nozzle includes:
         a first surface brought into press contact with the flange portion and continuing in a circumferential direction; and
         a second surface disposed outwards in a radial direction than the first surface and being brought into contact with the blow cavity mold, and
      wherein, from when the nozzle main body is moved and the first surface is brought into contact with the flange portion to when the second surface is brought into contact with the blow cavity mold and the movement of the nozzle main body is stopped, the first surface of the outer nozzle is overdriven so that the flange portion is airtightly sealed by the first surface, and
      wherein the blow nozzle further comprises an air vent groove communicating from an inner edge of the second surface to an outer edge of the second surface.

2. The blow nozzle according to claim 1,
   wherein the outer nozzle has a recessed portion receding inwards from the second surface,
   wherein the first surface is formed on a bottom surface of the recessed portion, and
   wherein, at a position which is spaced by a predetermined distance in a radial direction from a vertical center line of the blow nozzle and the molded article, when a depth of the recessed portion from the second surface to the first surface is referred to as d, an overdriven amount of the first surface of the outer nozzle is referred to as δ, and a thickness of the flange portion is referred to as t, d=t−δ is established.

3. The blow nozzle according to claim 1,
   wherein the blow nozzle further comprises a cylindrical inner nozzle disposed within the outer nozzle and introducing the blow air into the neck portion, and
   wherein the inner nozzle includes an insertion portion inserted into the neck portion in association with a movement of the nozzle main body before the first surface is brought into contact with the flange portion, the insertion portion being inserted into the neck portion to center the molded article.

4. The blow nozzle according to claim 3,
   wherein the inner nozzle includes:
      a base end flange supported by being held between the nozzle main body and the outer nozzle;
      an airtight seal member provided between facing surfaces of the base end flange portion and the nozzle main body; and
      a third surface formed to be diametrically larger than an outer diameter of the insertion portion, being brought into elastic contact with an end face of the neck portion by the airtight seal member, and continuing in the circumferential direction.

5. The blow nozzle according to claim 4,
   wherein, the inner nozzle further includes an air passage which communicates from an inner surface to an outer surface of the inner nozzle within a region between the base end flange and the insertion portion.

6. The blow nozzle according to claim 5,
   wherein, when the overdriven amount of the first surface of the outer nozzle is referred to as δ, 0<δ≤0.1 mm is established.

7. A blow molding machine that blow molds the molded article having the flange portion at the neck portion thereof into a hollow container, the blow molding machine comprising:
   the blow cavity mold which supports the flange portion of the molded article and in which the molded article is disposed within a cavity where the hollow container is blow molded; and
   a blow nozzle that introduces blow air into a molded article in which a flange portion provided around an open neck portion is supported by a blow cavity mold, the blow nozzle comprising:
   a nozzle main body moved upwards and downwards; and
   a cylindrical outer nozzle connected integrally to the nozzle main body and disposed around a circumference of the neck portion,
      wherein the outer nozzle includes:
         a first surface brought into press contact with the flange portion and continuing in a circumferential direction; and
         a second surface disposed outwards in a radial direction than the first surface and being brought into contact with the blow cavity mold, and
      wherein, from when the nozzle main body is moved and the first surface is brought into contact with the flange portion to when the second surface is brought into contact with the blow cavity mold and the movement of the nozzle main body is stopped, the first surface of the outer nozzle is overdriven so that the flange portion is airtightly sealed by the first surface, and
      wherein the blow nozzle further comprises an air vent groove communicating from an inner edge of the second surface to an outer edge of the second surface.

* * * * *